US010292210B2

(12) United States Patent
Umetsu et al.

(10) Patent No.: US 10,292,210 B2
(45) Date of Patent: May 14, 2019

(54) TRANSVERSE FLUX INDUCTION HEATING DEVICE

(75) Inventors: Kenji Umetsu, Tokyo (JP); Tsutomu Ueki, Tokyo (JP); Yasuhiro Mayumi, Tokyo (JP); Toshiya Takechi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 1021 days.

(21) Appl. No.: 13/577,967

(22) PCT Filed: Feb. 18, 2011

(86) PCT No.: PCT/JP2011/053526
§ 371 (c)(1),
(2), (4) Date: Aug. 9, 2012

(87) PCT Pub. No.: WO2011/102471
PCT Pub. Date: Aug. 25, 2011

(65) Prior Publication Data
US 2012/0305548 A1 Dec. 6, 2012

(30) Foreign Application Priority Data
Feb. 19, 2010 (JP) .................................. 2010-035198

(51) Int. Cl.
*H05B 6/36* (2006.01)
*H05B 6/10* (2006.01)
(Continued)

(52) U.S. Cl.
CPC .............. *H05B 6/104* (2013.01); *C21D 1/42* (2013.01); *C21D 9/60* (2013.01); *F27B 9/28* (2013.01);
(Continued)

(58) Field of Classification Search
CPC . C21D 9/60; H05B 6/365; H05B 6/04; H05B 6/06; H05B 6/107
(Continued)

(56) References Cited

U.S. PATENT DOCUMENTS 2,448,008 A 8/1948 Baker
2,448,009 A 8/1948 Baker
(Continued)

FOREIGN PATENT DOCUMENTS

CN 101120617 2/2008
EP 0713349 A1 5/1996
(Continued)

OTHER PUBLICATIONS

International Search Report dated May 24, 2011, issued in corresponding PCT Application No. PCT/JP2011/053526.
(Continued)

*Primary Examiner* — Jimmy Chou
(74) *Attorney, Agent, or Firm* — Birch, Stewart, Kolasch & Birch, LLP

(57) ABSTRACT

The transverse flux induction heating device is allows an alternating magnetic field to intersect the sheet face of a conductive sheet which is conveyed in one direction, thereby inductively heating the conductive sheet. The transverse flux induction heating device includes a heating coil disposed such that a coil face faces the sheet face of the conductive sheet; a core around which the heating coil is coiled; a shielding plate formed of a conductor and disposed between the core and a side end portion in the direction perpendicular to a conveyance direction of the conductive sheet; and a non-conductive soft magnetic material which is attached to the shielding plate, wherein the shielding plate is interposed between the core and the non-conductive soft magnetic material.

7 Claims, 8 Drawing Sheets

(51) Int. Cl.
  *C21D 9/60* (2006.01)
  *F27B 9/28* (2006.01)
  *F27D 11/06* (2006.01)
  *C21D 1/42* (2006.01)

(52) U.S. Cl.
  CPC ............ *F27D 11/06* (2013.01); *H05B 6/365* (2013.01); *Y02P 10/253* (2015.11)

(58) Field of Classification Search
  USPC ....... 219/671, 676, 660, 661, 673, 606, 611, 219/656, 667, 645, 670, 619
  See application file for complete search history.

(56) References Cited

U.S. PATENT DOCUMENTS

| | | | |
|---|---|---|---|
| 2,448,011 A | 8/1948 | Baker et al. | |
| 2,448,012 A | 8/1948 | Baker | |
| 2,448,062 A | 8/1948 | Stoltz | |
| 2,452,197 A | 10/1948 | Kennedy | |
| 2,556,223 A * | 6/1951 | Schnure, Jr. | H05B 6/365 219/645 |
| 2,722,589 A | 11/1955 | Marquardt | |
| 2,761,939 A | 9/1956 | Finchelstein, et al. | |
| 2,773,161 A | 12/1956 | Baker | |
| 3,041,434 A * | 6/1962 | Alf | C21D 9/60 219/645 |
| 3,272,956 A * | 9/1966 | Baermann | C21D 1/42 219/645 |
| 3,444,346 A * | 5/1969 | Cable | H05B 6/104 219/645 |
| 3,508,024 A * | 4/1970 | Cannon | H05B 6/145 219/619 |
| 3,705,967 A * | 12/1972 | Bobart et al. | C21D 1/42 219/645 |
| 3,720,803 A * | 3/1973 | Lewis | C21D 1/42 219/632 |
| 4,185,183 A | 1/1980 | Kamimoto | |
| 4,321,444 A | 3/1982 | Davies | |
| 4,357,512 A | 11/1982 | Nishimoto et al. | |
| 4,518,840 A | 5/1985 | Bronner | |
| 4,531,037 A | 7/1985 | Camus | |
| 4,585,916 A | 4/1986 | Rich | |
| 4,649,249 A * | 3/1987 | Odor | B30B 15/064 100/321 |
| 4,673,781 A | 6/1987 | Nuns et al. | |
| 4,678,883 A | 7/1987 | Saitoh et al. | |
| 4,708,325 A | 11/1987 | Georges | |
| 4,751,360 A | 6/1988 | Ross | |
| 4,778,971 A | 10/1988 | Sakimoto et al. | |
| 4,795,872 A * | 1/1989 | Hagisawa | C21D 9/60 219/645 |
| 4,891,484 A | 1/1990 | Waggott et al. | |
| 4,987,281 A | 1/1991 | Yao | |
| 5,001,319 A | 3/1991 | Holmstrom | |
| 5,055,647 A | 10/1991 | Heyes et al. | |
| 5,157,233 A | 10/1992 | Inokuma et al. | |
| 5,179,258 A | 1/1993 | Arvedi et al. | |
| 5,397,877 A * | 3/1995 | Couffet | F27B 9/067 219/645 |
| 5,403,994 A | 4/1995 | Havas et al. | |
| 5,412,183 A | 5/1995 | Buffenoir et al. | |
| 5,495,094 A | 2/1996 | Rowan et al. | |
| 5,578,233 A | 11/1996 | Arvedi et al. | |
| 5,621,324 A | 4/1997 | Ota et al. | |
| 5,739,506 A * | 4/1998 | Hanton et al. | 219/645 |
| 5,770,838 A | 6/1998 | Rohrbaugh et al. | |
| 5,822,669 A | 10/1998 | Okabayashi et al. | |
| 5,827,056 A | 10/1998 | Rohrbaugh et al. | |
| 5,837,976 A | 11/1998 | Loveless et al. | |
| 6,067,015 A * | 5/2000 | Lian et al. | 340/572.1 |
| 6,180,928 B1 | 1/2001 | Garrigus | |
| 6,285,015 B1 | 9/2001 | Doizaki et al. | |
| 6,498,328 B2 | 12/2002 | Anderhuber et al. | |
| 6,570,141 B2 | 5/2003 | Ross | |
| 6,576,878 B2 | 6/2003 | Thorpe et al. | |
| 6,864,419 B2 | 3/2005 | Lovens | |
| 6,872,925 B2 | 3/2005 | Asakura et al. | |
| 6,963,056 B1 | 11/2005 | Peysakhovich et al. | |
| 7,142,078 B2 | 11/2006 | Rostaing et al. | |
| 7,183,526 B2 | 2/2007 | Yoshino et al. | |
| 7,482,559 B2 * | 1/2009 | Cao | H05B 6/104 148/576 |
| 7,525,073 B2 | 4/2009 | Lovens et al. | |
| 8,502,122 B2 * | 8/2013 | Hirota | C21D 1/10 219/645 |
| 8,803,046 B2 | 8/2014 | Warner et al. | |
| 9,247,590 B2 | 1/2016 | Fukutani et al. | |
| 9,578,693 B2 | 2/2017 | Umetsu et al. | |
| 2001/0001464 A1 | 5/2001 | Godwin | |
| 2002/0011486 A1 | 1/2002 | Anderhuber et al. | |
| 2002/0121512 A1 * | 9/2002 | Thorpe | H05B 6/365 219/645 |
| 2002/0148830 A1 | 10/2002 | Ross | |
| 2003/0222079 A1 * | 12/2003 | Lawton et al. | 219/619 |
| 2004/0155033 A1 | 8/2004 | Spatafora et al. | |
| 2006/0124633 A1 | 6/2006 | Roehr et al. | |
| 2007/0012663 A1 | 1/2007 | Hosokawa et al. | |
| 2007/0131673 A1 | 6/2007 | Rapoport et al. | |
| 2007/0181567 A1 | 8/2007 | Lovens | |
| 2007/0194010 A1 | 8/2007 | Lovens et al. | |
| 2007/0235445 A1 * | 10/2007 | Wilgen et al. | 219/635 |
| 2007/0235446 A1 | 10/2007 | Cao et al. | |
| 2008/0296290 A1 | 12/2008 | Cao et al. | |
| 2009/0057301 A1 * | 3/2009 | Lovens | H05B 6/365 219/645 |
| 2009/0255924 A1 * | 10/2009 | Lovens | H05B 6/40 219/645 |
| 2010/0155390 A1 | 6/2010 | Hirota | |
| 2010/0225431 A1 | 9/2010 | Kadota et al. | |
| 2011/0033077 A1 | 2/2011 | Papakyriacou et al. | |

FOREIGN PATENT DOCUMENTS

| | | |
|---|---|---|
| GB | 2182230 A | 5/1987 |
| JP | 62-035490 | 2/1987 |
| JP | 05-266975 A | 10/1993 |
| JP | 2001-006861 A | 1/2001 |
| JP | 2003-133037 | 5/2003 |
| JP | 2010-044924 | 2/2010 |
| RU | 2 236 770 | 9/2004 |
| WO | 2007/101058 | 9/2007 |

OTHER PUBLICATIONS

Notice of Allowance dated Nov. 12, 2013 issued in corresponding RU Application No. 2012137107 [With English Translation].

Office Action dated Apr. 29, 2014 issued in corresponding Chinese Application No. 201180009731.7 [with English Translation of Search Report].

European Search Report dated Jun. 25, 2015 issued in corresponding European Application No. 11744757.3.

Office Action dated Sep. 27, 2018 in counterpart U.S. Appl. No. 16/108,604.

* cited by examiner

TRANSVERSE FLUX INDUCTION HEATING DEVICE

FIELD OF THE INVENTION

The present invention relates to a transverse flux induction heating device. In particular, the transverse flux induction heating device is suitably used to inductively heat a conductive sheet by making an alternating magnetic field approximately perpendicularly intersect the conductive sheet.

This application is a national stage application of International Application No. PCT/JP2011/053526, filed Feb. 18, 2011, which claims priority to Japanese Patent Application No. 2010-35198, filed on Feb. 19, 2010, the content of which is incorporated herein by reference.

DESCRIPTION OF RELATED ART

In the past, heating a conductive sheet such as a steel sheet, using an induction heating device has been performed. The induction heating device generates Joule heat based on an eddy current which is induced in the conductive sheet by an alternating magnetic field (an alternating-current magnetic field) generated from a coil, in the conductive sheet, and heats the conductive sheet by the Joule heat. A transverse flux induction heating device is one type of such an induction heating device. The transverse flux induction heating device heats a conductive sheet of a heating target by making an alternating magnetic field approximately perpendicularly intersect the conductive sheet.

In the case of using such a transverse flux induction heating device, unlike the case of using a solenoid-type induction heating device, there is a problem in that both ends (both side ends) in the width direction of the conductive sheet of the heating target become overheated.

The techniques described in Patent Citation 1 and Patent Citation 2 are techniques related to such a problem.

In the technique described in Patent Citation 1, a movable plain shielding plate made of a non-magnetic metal is provided between a coil and each of both side ends of a conductive sheet of a heating target.

Further, in the technique described in Patent Citation 2, a rhombic coil and an oval coil which have different heating patterns are disposed along the conveyance direction of a conductive sheet of a heating target, thereby heating the conductive sheet in a desired heating pattern with respect to the width direction of the conductive sheet.

PATENT CITATION

[Patent Citation 1] Japanese Unexamined Patent Application, First Publication No. S62-35490

[Patent Citation 2] Japanese Unexamined Patent Application, First Publication No. 2003-133037

SUMMARY OF THE INVENTION

Problems to be Solved by the Invention

However, by only providing a simple plate-shaped shielding plate between the coil and each of both side ends of the conductive sheet of the heating target, as in the technique described in Patent Citation 1, since the eddy current spreads in an area slightly to the inside of both side ends of the conductive sheet, eddy current density is small, and since eddy currents flowing in both side ends of the conductive sheet cannot flow out of the conductive sheet, eddy current density becomes large at both side ends. Therefore, it is difficult to lower the temperatures of both side ends of the conductive sheet and the smoothness of the temperature distribution in the width direction of the conductive sheet is also significantly lowered (in particular, the slope of the temperature distribution at each of both side ends of the conductive sheet becomes large).

Further, in the technique described in Patent Citation 2, it is possible to suppress lowering of the smoothness of the temperature distribution in the width direction of a specific conductive sheet. However, if the sheet width of the conductive sheet is changed, the coil has to be reset depending on the sheet width. Therefore, a mechanism for moving the coil is required and it is difficult to easily and quickly respond to a change in sheet width.

In addition, in the techniques described in Patent Citation 1 and Patent Citation 2, if the conductive sheet moves in a meandering manner, the smoothness of the temperature distribution in the width direction of the conductive sheet is lowered.

The present invention has been made in view of such problems and has an object of providing a transverse flux induction heating device which allows unevenness of a temperature distribution in the width direction of a conductive sheet of a heating target to be reduced and allows variations in temperature distribution in the width direction of the conductive sheet of the heating target due to meandering of the conductive sheet to be reduced.

Methods for Solving the Problem (1) A transverse flux induction heating device according to an aspect of the present invention allows an alternating magnetic field to intersect the sheet face of a conductive sheet which is conveyed in one direction, thereby inductively heating the conductive sheet. The transverse flux induction heating device includes: a heating coil disposed such that a coil face faces the sheet face of the conductive sheet; a core around which the heating coil is coiled; a shielding plate formed of a conductor and disposed between the core and a side end portion in a direction perpendicular to the conveyance direction of the conductive sheet; and a non-conductive soft magnetic material which is attached to the shielding plate, wherein the shielding plate is interposed between the core and the non-conductive soft magnetic material.

(2) The transverse flux induction heating device according to the above (1) may further include a heat-resistant plate which is attached to the non-conductive soft magnetic material, wherein the heat-resistant plate is disposed closer to the conductive sheet than the non-conductive soft magnetic material.

(3) In the transverse flux induction heating device according to the above (1), the shielding plate may have a cross section parallel to the coil face, and the cross section may include the non-conductive soft magnetic material.

(4) In the transverse flux induction heating device according to the above (1), a depressed portion which faces the side end portion in the direction perpendicular to the conveyance direction of the conductive sheet may be formed in the surface facing the conductive sheet of the shielding plate and the non-conductive soft magnetic material may be housed in the depressed portion.

(5) In the transverse flux induction heating device according to the above (4), a portion which is tapered off toward a side close to a central portion in a direction perpendicular to the conveyance direction of the conductive sheet from a side away from the central portion in the direction perpendicular to the conveyance direction of the conductive sheet may be included in the depressed portion.

(6) In the transverse flux induction heating device according to the above (4), a first portion which is tapered off toward the downstream side from the upstream side in the conveyance direction of the conductive sheet and a second portion which is tapered off toward the upstream side from the downstream side in the conveyance direction of the conductive sheet may be included in the depressed portion, and the first portion and the second portion may face each other in the conveyance direction of the conductive sheet.

(7) In the transverse flux induction heating device according to the above (6), the first portion may be rounded toward the downstream side and the second portion may be rounded toward the upstream side.

Effects of the Invention

According to the present invention, the non-conductive soft magnetic material is mounted on the shielding plate which is disposed between the core around which the coil is coiled and an end portion in the width direction of the conductive sheet. Through the non-conductive soft magnetic material, the magnitude of an eddy current in the shielding plate, which flows in the vicinity of the non-conductive soft magnetic material, can be made large. Therefore, unevenness of the temperature distribution in the width direction of the conductive sheet of a heating target can be reduced and variations in the temperature distribution in the width direction of the conductive sheet of the heating target due to meandering of the conductive sheet can be reduced.

DETAILED DESCRIPTION OF THE INVENTION

Figure 1:
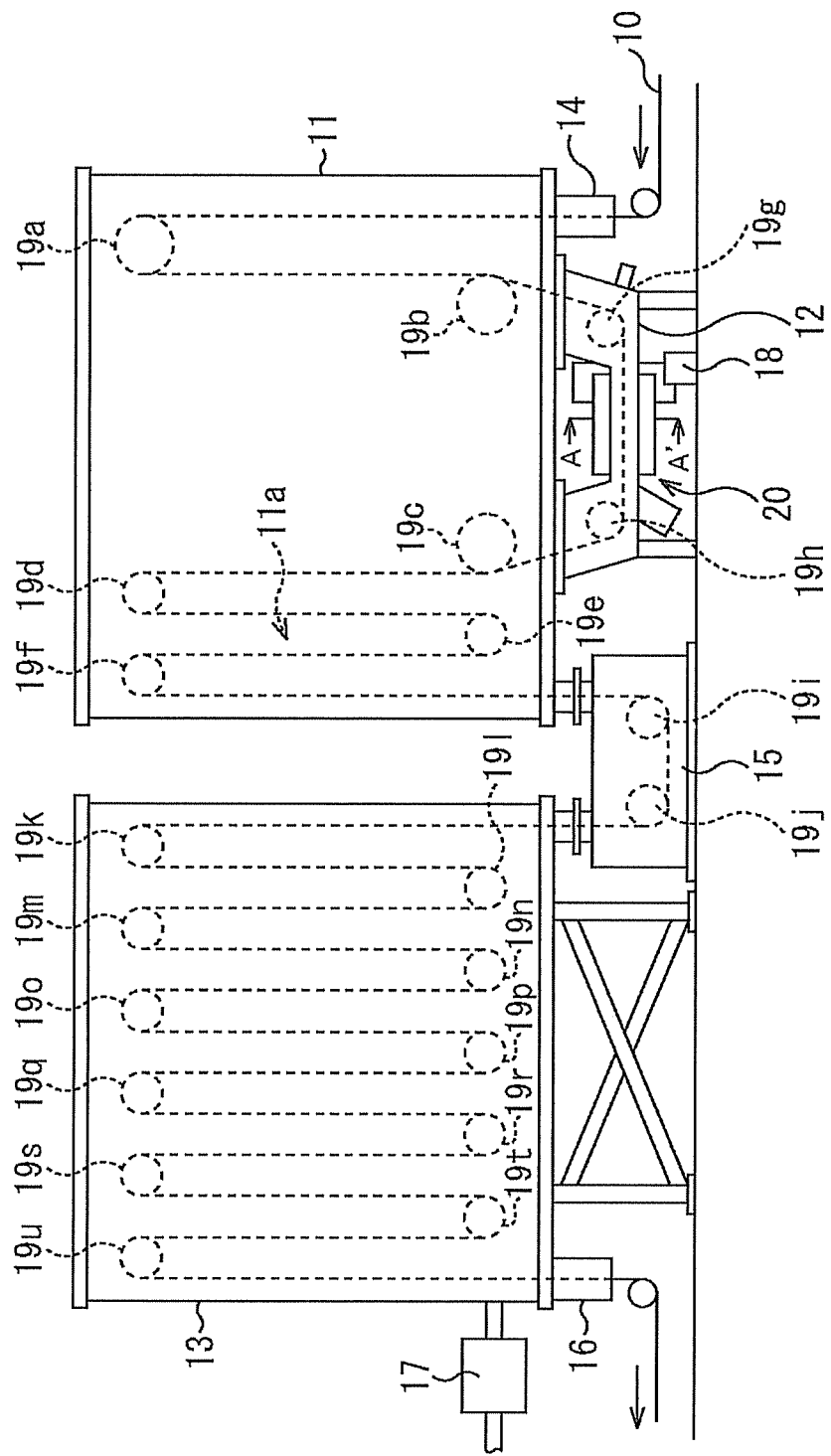
FIG. 1 is a side view showing one example of the schematic configuration of a continuous annealing line for a steel sheet according to an embodiment of the present invention.

Hereinafter, an embodiment of the present invention will be described referring to the drawings. In this embodiment, a case where a transverse flux induction heating device is applied to a continuous annealing line for a steel sheet is described as an example. In addition, in the following description, the "transverse flux induction heating device" is referred to as an "induction heating device" for brevity, as necessary.

[Configuration of Continuous Annealing Line]

FIG. 1 is a side view showing one example of the schematic configuration of a continuous annealing line for a steel sheet. In addition, in each drawing, for convenience of explanation, only the necessary configuration is simplified and shown.

In FIG. 1, a continuous annealing line 1 includes a first container 11, a second container 12, a third container 13, a first sealing roller assembly 14, a conveyance unit 15, a second sealing roller assembly 16, a gas supply unit 17, an alternating-current power supply unit 18, rollers 19a to 19u (19), and an induction heating device 20.

The first sealing roller assembly 14 transports a steel strip (a strip-shaped sheet, a conductive sheet) 10 into the first container 11 while shielding the first container 11 from the external air. The steel strip 10 conveyed into the first container 11 by the first sealing roller assembly 14 is conveyed into the second container 12 by the rollers 19a and 19b in the first container 11. The steel strip 10 conveyed into the second container 12 is conveyed into the first container 11 again by the rollers 19g and 19h while being heated by the induction heating device 20 disposed above and below the horizontal portion of the second container 12 (the steel strip 10 which is conveyed). Here, the induction heating device 20 is electrically connected to the alternating-current power supply unit 18 and receives alternating-current power from the alternating-current power supply unit 18, thereby generating an alternating magnetic field which intersects approximately perpendicularly to the sheet face of the steel strip 10, and inductively heating the steel strip 10. In addition, the details of the configuration of the induction heating device 20 will be described later. Further, in the following explanation, "electrical connection" is referred to as "connection" for brevity, as necessary.

The steel strip 10 returned into the first container 11 is conveyed to the conveyance unit 15 by way of a soaking and slow cooling stage by the rollers 19c to 19f. The steel strip 10 conveyed to the conveyance unit 15 is conveyed into the third container 13 by the rollers 19i and 19j. The steel strip 10 conveyed into the third container 13 is conveyed while being moving in a vertically up and down manner by the rollers 19k to 19u and rapidly cooled in the third container 13.

The second sealing roller assembly 16 sends the steel strip 10 rapidly cooled in this way to a post-process while blocking the third container 13 from external air.

Into "the first container 11, the second container 12, the third container 13, and the conveyance unit 15" which become a "transport pathway of the steel strip 10" as described above, non-oxidizing gas is supplied by the gas supply unit 17. Then, by "the first sealing roller assembly 14 and the second sealing roller assembly 16" which block the inside (the inside of the continuous annealing line 1) from the outside (external air), a non-oxidizing gaseous atmosphere is maintained in the first container 11, the second container 12, the third container 13, and the conveyance unit 15.

[Configuration of Induction Heating Device]

Figure 2A:
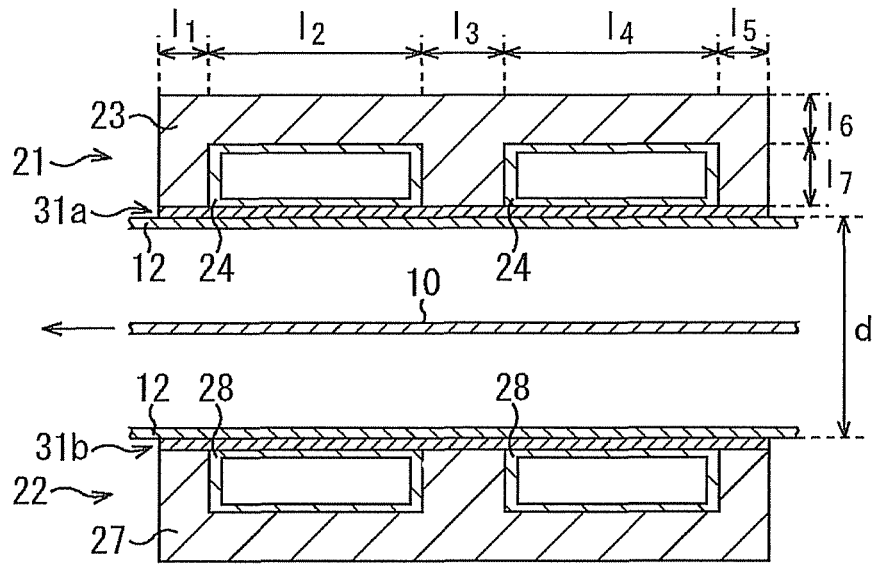
FIG. 2A is a vertical cross-sectional view showing one example of the configuration of an induction heating device according to this embodiment.
Figure 2B:
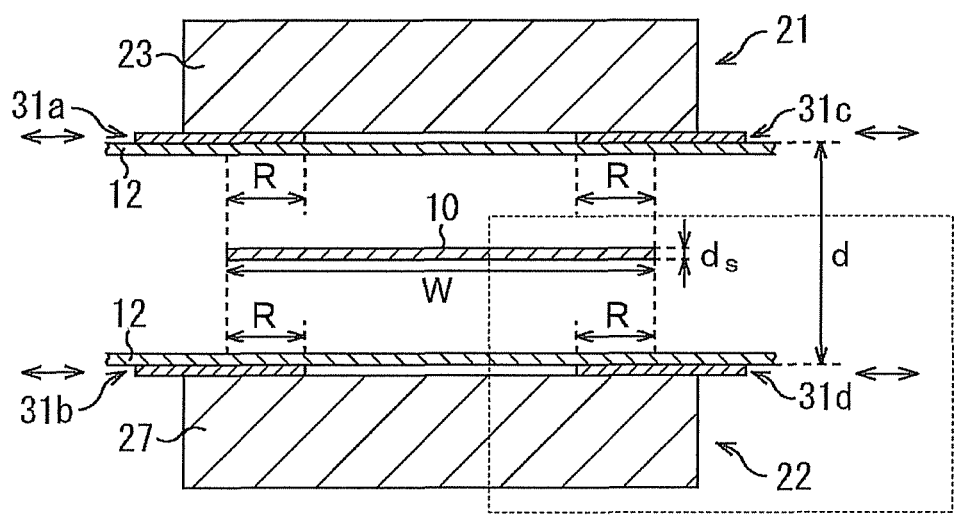
FIG. 2B is a vertical cross-sectional view showing one example of the configuration of the induction heating device according to this embodiment.
Figure 2C:
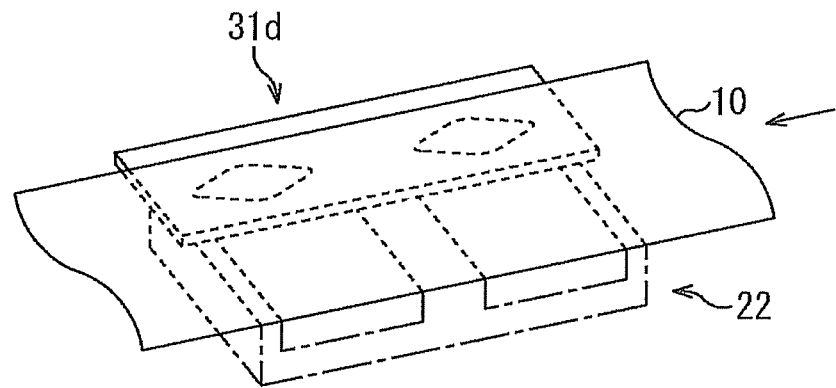
FIG. 2C is a fragmentary perspective view showing one example of the configuration of the induction heating device according to this embodiment.

FIGS. 2A to 2C are diagrams showing one example of the configuration of the induction heating device.

Specifically, FIG. 2A is a diagram showing one example of the induction heating device 20 in this embodiment, as viewed from a side of the continuous annealing line, and is a vertical cross-sectional view cut (in the up-and-down direction in FIG. 1) along the longitudinal direction of the steel strip 10. In FIG. 2A, the steel strip 10 is conveyed in the left direction (refer to an arrow pointing from the right to the left in FIG. 2A). Further, FIG. 2B is a vertical cross-sectional view showing one example of the induction heating device 20 in this embodiment, as viewed in a direction of A-A' in FIG. 1 (that is, a diagram as viewed from the downstream in a sheet conveyance direction). In FIG. 2B, the steel strip 10 is conveyed in a direction from the back of the drawing to the front. Further, FIG. 2C is a fragmentary perspective view partially showing one example of the induction heating device 20 in this embodiment. In FIG. 2C, a lower right area shown in FIG. 2B is looked down from above the steel strip 10.

In FIGS. 2A to 2C, the induction heating device 20 includes an upper side inductor 21 and a lower side inductor 22.

The upper side inductor 21 includes a core 23, an upper side heating coil (a heating coil) 24, and shielding plates 31a and 31c.

The upper side heating coil 24 is a conductor coiled around the core 23 through a slot of the core 23 (here, a depressed portion of the core 23) and is a coil (a so-called single turn) in which the number of turns is "1". Further, as shown in FIG. 2A, the upper side heating coil 24 has a portion, the vertical cross-sectional shape of which is a hollow rectangle. A water-cooling pipe is connected to the end face of a hollow portion of the hollow rectangle. Cooling water which is supplied from the water-cooling pipe flows in the hollow portion (the inside of the upper side heating coil 24) of the hollow rectangle, so that the upper side inductor 21 is cooled. Further, the shielding plates 31a and 31c are mounted on the bottom surface (the slot side) of the core 23.

In addition, in FIG. 2A, a length $l_1$ in the upper side inductor 21 is 45 [mm], a length $l_2$ is 180 [mm], a length $l_3$ is 80 [mm], a length $l_4$ is 180 [mm], a length $l_5$ is 45 [mm], a length $l_6$ is 45 [mm], and a length $l_7$ is 45 [mm]. Further, a width W of the steel strip 10 is 900 [mm] and a thickness $d_s$ is 0.3 [mm]. However, these dimensions are not limited to the values described above.

The lower side inductor 22 includes a core 27, a lower side heating coil (a heating coil) 28, and shielding plates 31b and 31d, similarly to the upper side inductor 21.

The lower side heating coil 28 is also a conductor coiled around the core 27 through a slot of the core 27 and is a coil (a so-called single turn) in which the number of turns is "1", similarly to the upper side heating coil 24. Further, the lower side heating coil 28 has a portion, the vertical cross-sectional shape of which is a hollow rectangle, similarly to the upper side heating coil 24. A water-cooling pipe is connected to the end face of a hollow portion of the hollow rectangle and can flow cooling water into the hollow portion of the hollow rectangle.

Further, a coil face (a face in which a loop is formed; a face in which a line of magnetic force penetrates) of the upper side heating coil 24 of the upper side inductor 21 and a coil face of the lower side heating coil 28 of the lower side inductor 22 face each other with the steel strip 10 interposed therebetween. In addition, the plate faces of the shielding plates 31a to 31d (31) face side end portions (edges) in the sheet width direction of the steel strip 10. In order to satisfy such a positional relationship, the upper side inductor 21 is provided further on the upper side (in the vicinity of the upper surface of the horizontal portion of the second container 12) than the steel strip 10 and the lower side inductor 22 is provided further on the lower side (in the vicinity of the lower surface of the horizontal portion of the second container 12) than the steel strip 10.

As described above, the upper side inductor 21 and the lower side inductor 22 are different in the position to be disposed, but have the same configuration.

Further, in this embodiment, the shielding plates 31a to 31d can be individually moved in the width direction (a direction of a double-headed arrow shown in FIG. 2B) of the steel strip 10 based on an operation of a driving device (not shown).

Further, in this embodiment, a distance d between the upper side heating coil 24 and the lower side heating coil 28, the heating coil widths $l_2$ and $l_4$ in the upper side heating coil 24, and the heating coil widths $l_2$ and $l_4$ in the lower side heating coil 28 are the same. Further, a position where an "overlap length R in the width direction of the steel strip 10" between each of both side end portions of the steel strip 10 and each of the shielding plates 31a to 31d is 90 [mm] is defined as the reference position.

Here, the heating coil width is the length in the width direction of the upper side heating coil 24 (the lower side heating coil 28) that is in the slot. In the example shown in FIG. 2A, the heating coil width is equal to the length in the width direction of each of the copper pipes 41a to 41d shown in FIG. 3, which will be described later, and is approximately the same length as the width of the slot of each of the cores 23 and 27.

In addition, in the following explanation, each of the heating coil width of the upper side heating coil 24 and the heating coil width of the lower side heating coil 28 is simply referred to as a heating coil width, as necessary, and the distance between the upper side heating coil 24 and the lower side heating coil 28 is referred to as a gap, as necessary.

[Configuration of Heating Coil]

Figure 3:
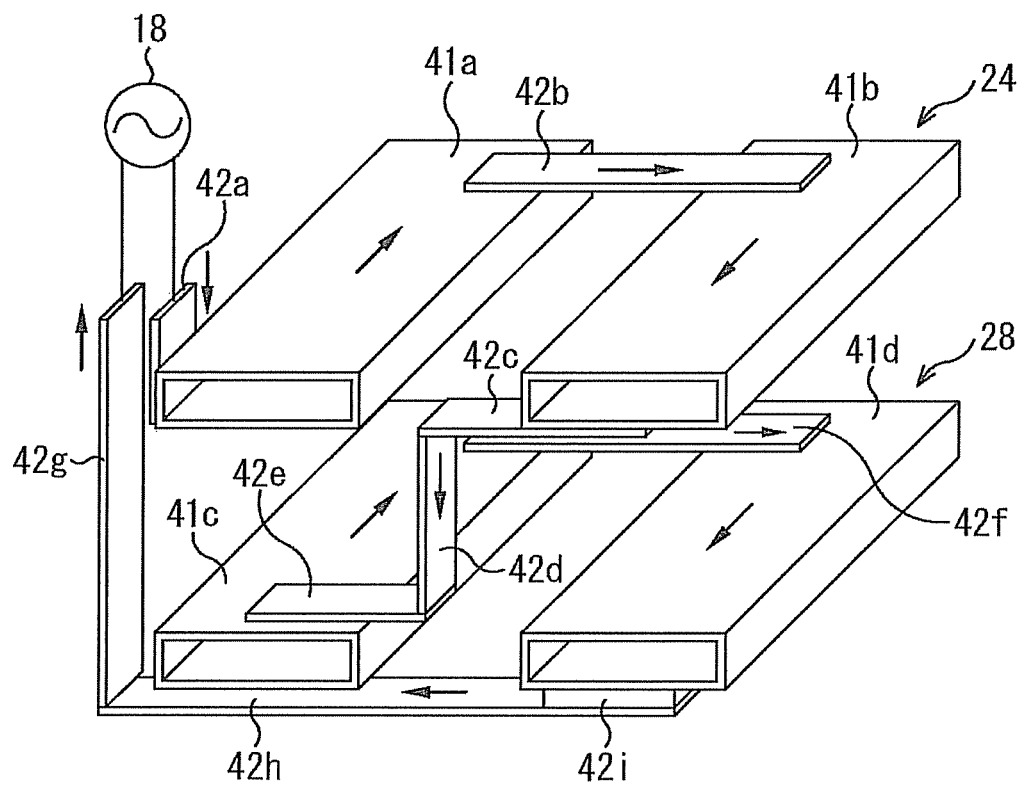
FIG. 3 is a diagram showing one example of the configurations of an upper side heating coil and a lower side heating coil according to this embodiment.

FIG. 3 is a diagram showing one example of the configurations of the upper side heating coil 24 and the lower side heating coil 28. In addition, an arrow shown in FIG. 3 represents one example of a direction in which an electric current flows at a certain time.

As shown in FIG. 3, the upper side heating coil 24 has the copper pipes 41a and 41b, and a copper bus bar (a connection plate) 42b which is connected to the base end sides of the copper pipes 41a and 41b. Further, the lower side heating coil 28 has the copper pipes 41c and 41d, and a copper bus bar 42f which is connected to the base end sides of the copper pipes 41c and 41d.

One end (the front end side of the copper pipe 41a) of the upper side heating coil 24 and an output terminal on one side of the alternating-current power supply unit 18 are mutually connected through a copper bus bar 42a. On the other hand, the other end (the front end side of the copper pipe 41b) of the upper side heating coil 24 and one end (the front end side of the copper pipe 41c) of the lower side heating coil 28 are mutually connected through copper bus bars 42c to 42e. Further, the other end (the front end side of the copper pipe 41d) of the lower side heating coil 28 is mutually connected to an output terminal on the other side of the alternating-current power supply unit 18 through copper bus bars 42i, 42h, and 42g.

As described above, the upper side heating coil 24 and the lower side heating coil 28 are connected in series with respect to the alternating-current power supply unit 18 by the combination of the copper pipes 41a to 41d (41) and the copper bus bars 42a to 42i (42) and form coils each of which the number of turns is "1". In FIG. 3, a large magnetic flux is generated toward the bottom from the top of a central portion surrounded by the copper pipes 41 and the copper bus bars 42, and the magnetic flux passes through the steel strip 10, whereby Joule heat is generated in the steel strip 10, so that the steel strip 10 is heated.

In addition, here, in order to clearly illustrate the configurations of the upper side heating coil 24 and the lower side heating coil 28, as shown in FIG. 3, the copper pipes 41a to 41d and the copper bus bars 42a to 42g are connected to each other. However, when the upper side heating coil 24 and the lower side heating coil 28 are coiled around the cores 23 and 27, there is a need to pass (attach) the copper pipes 41a to 41d through the slots of the cores 23 and 27. Therefore, in fact, the copper bus bars 42 are attached to the copper pipes 41a to 41d to avoid portions where the copper pipes 41 are installed to the cores 23 and 27.

<Configuration of Shielding Plate>

FIGS. 4A to 4E are diagrams showing one example of the configuration of the shielding plate 31.

Figure 4A:
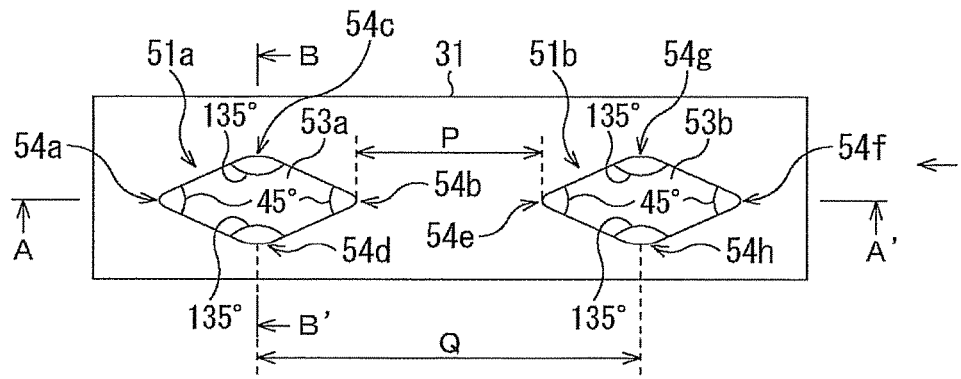
FIG. 4A is a top view showing one example of the configuration of a shielding plate according to this embodiment.
Figure 4B:
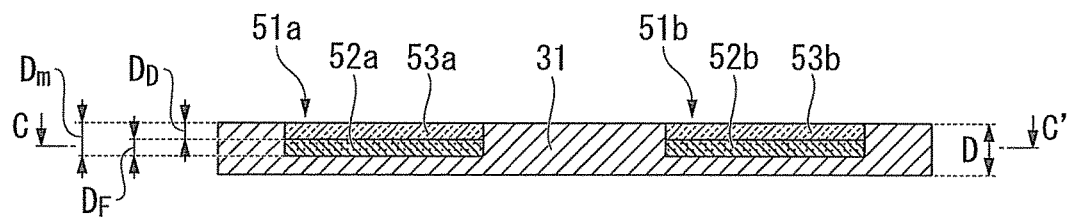
FIG. 4B is a vertical cross-sectional view showing one example of the configuration of the shielding plate according to this embodiment.
Figure 4C:
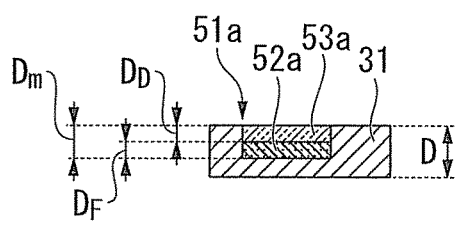
FIG. 4C is a vertical cross-sectional view showing one example of the configuration of the shielding plate according to this embodiment.
Figure 4D:
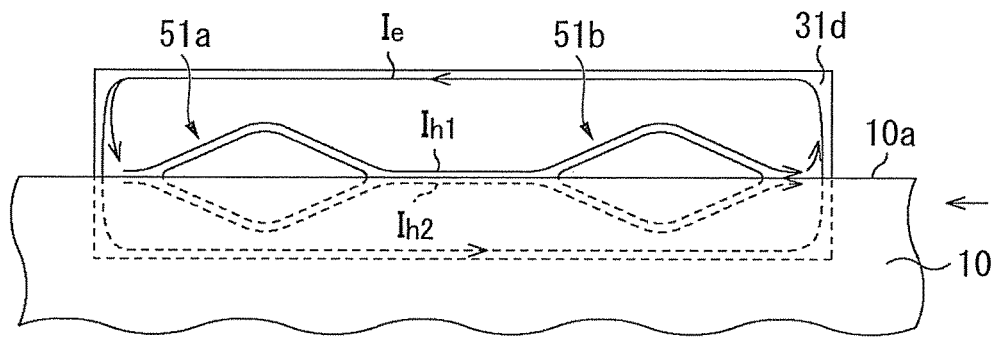
FIG. 4D is a fragmentary view when an area including a shielding plate 31d according to this embodiment is viewed from directly above a steel strip 10.
Figure 4E:
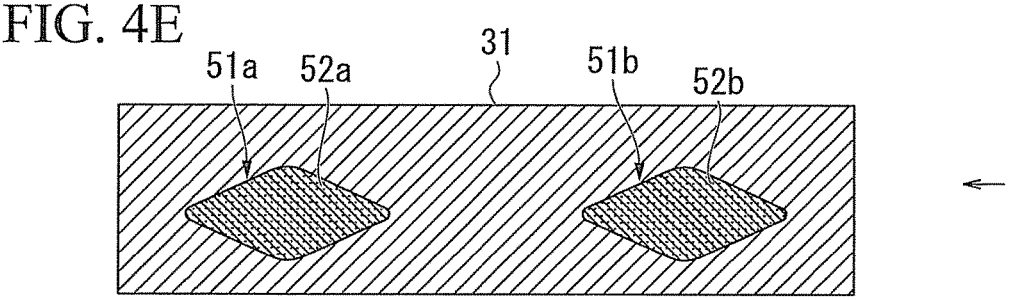
FIG. 4E is a transverse cross-sectional view showing one example of the configuration of the shielding plate according to this embodiment.

Specifically, FIG. 4A is a top view of the shielding plate 31 when viewed from directly above (the steel strip 10 side). Further, FIG. 4B is a vertical cross-sectional view as viewed from the direction of A-A' in FIG. 4A. FIG. 4C is a vertical cross-sectional view as viewed from the direction of B-B' in FIG. 4A. FIG. 4D is a view when an area including the shielding plate 31d shown in FIG. 2C is viewed from directly above the steel strip 10. FIG. 4E is a transverse cross-sectional view as viewed from the direction of C-C' in FIG. 4B. In addition, in FIG. 4D, only a portion which is required to explain the positional relationship between the steel strip 10 and the shielding plate 31d is shown. Further, in FIG. 4D, eddy currents $I_e$, $I_{h1}$, and $I_{h2}$ which flow in the shielding plate 31d are conceptually shown. In addition, the steel strip 10 is conveyed in the direction of an arrow shown in the right end in FIGS. 4A and 4D.

In addition, a conveyance direction of the steel strip 10 approximately corresponds to the depth direction of the shielding plate 31, and a direction (the width direction of the steel strip 10) perpendicular to the conveyance direction of the steel strip 10 on the sheet face approximately corresponds to the width direction of the shielding plate. Further, the plate thickness (the thickness) direction of the shielding plate 31 approximately corresponds to a direction (the sheet thickness direction of the steel strip 10) perpendicular to the coil face of the heating coil (for example, the upper side heating coil 24).

In FIGS. 4A to 4C, the shielding plate 31 is made of copper and has depressed portions 51a and 51b (51) having the same size and shape. The depressed portions 51a and 51b are disposed to have a distance therebetween in the conveyance direction of the steel strip 10.

As shown in FIG. 4A, the shape (the opening shape) in the plate face direction (the plate thickness direction of the shielding plate 31) of each of the depressed portions 51a and 51b is a rhombus in which each of the corner portions 54a to 54h (54) is rounded.

In FIG. 4A, a distance P between a corner portion which is an end portion of the depressed portion 51a and is on the upstream side in the conveyance direction of the steel strip 10 and a corner portion which is an end portion of the depressed portion 51b and is on the downstream side in the conveyance direction of the steel strip 10 is 150 [mm]. Further, a distance Q between a corner portion which is an end portion of the depressed portion 51a and is located in the center in the conveyance direction of the steel strip 10 and a corner portion which is an end portion of the depressed portion 51b and is located in the center in the conveyance direction of the steel strip 10 is 310 [mm].

As shown in FIG. 4D, in this embodiment, the shielding plate 31 is moved in the width direction of the steel strip 10 such that a side end 10a of the steel strip 10 and the depressed portions 51a and 51b overlap each other when viewed from the up-and-down direction. As a specific example thereof, the side end 10a of the steel strip 10 and the longest portions on the plate face of the depressed portions 51a and 51b (diagonal line portions of the rounded rhombuses parallel to the conveyance direction of the steel strip 10) overlap each other when viewed from the up-and-down direction (a direction perpendicular to the sheet face of the steel strip 10).

By disposing the shielding plate 31 so as to be in such a positional relationship, a main magnetic flux, which is generated by operating the induction heating device 20, and thereby flowing an alternating current in the upper side heating coil 24 and the lower side heating coil 28, can be shielded by the shielding plate 31. However, eddy currents are generated in both side end portions of the steel strip 10 by the main magnetic flux, and the eddy current touches the side end of the steel strip, so that a current density in the side end becomes high and a difference in temperature occurs between the side end and the vicinity thereof. Therefore, the inventors have found from the results of extensive studies that the difference in temperature can be reduced by housing non-conductive soft magnetic plates 52a and 52b (52), each of which is composed of a soft magnetic ferrite (for example, a Mn—Zn-based ferrite or a Ni—Zn-based ferrite) or the like, into the above-mentioned depressed portions 51a and 51b. Here, the non-conductive soft magnetic plates 52a and 52b can be fixed to the depressed portions 51a and 51b of the shielding plate 31 using, for example, an adhesive.

That is, as shown in FIG. 4D, if a portion of the eddy current $I_e$ which flows so as to go around the end portion of the shielding plate 31 is branched so that the eddy currents $I_{h1}$ and $I_{h2}$ flow along the edges of the depressed portions 51a and 51b, an eddy current of the steel strip 10 which is generated by magnetic fields that are created by the eddy currents $I_{h1}$ and $I_{h2}$ cancels out and weakens an eddy current (an eddy current due to the main magnetic flux) which flows in the side end portion of the steel strip 10. As a result, the effect of pushing the eddy current which flows in the side end portion of the steel strip 10 into the inside in the width direction of the steel strip 10 can be produced, so that homogenization of eddy current density in the vicinity of the side end 10a of the steel strip 10 progresses and a difference in temperature between the side end portion (a high-temperature portion) of the steel strip 10 and a portion (a low-temperature portion) further inside than the side end portion is reduced.

Therefore, large eddy currents $I_{h1}$ and $I_{h2}$ need to flow along the edges of the depressed portions formed in the shielding plate. The inventors have obtained knowledge that in the shielding plate with only a depressed portion simply formed therein, there is a possibility that the effect of reducing the above-mentioned difference in temperature cannot be reliably obtained. This is considered to be because an eddy current continuously flows through the bottom surface of the depressed portion. Therefore, the inventors have found that by housing the non-conductive soft magnetic plates 52a and 52b in the depressed portions 51a and 51b of the shielding plate 31, as described above, it is possible to strengthen a magnetic field which is generated by the eddy current flowing in the shielding plate 31 due to the main magnetic flux. By the strengthening of the magnetic field, it is possible to make the magnitude of the eddy current which is branched from a pathway going around the end portion of the shielding plate 31 larger. As a result, it is possible to make the magnitudes of the eddy currents $I_{h1}$ and $I_{h2}$ which flow along the edges of the depressed portions 51a and 51b larger (than where are the non-conductive soft magnetic plates 52a and 52b not being housed).

For the reason as described above, in this embodiment, the non-conductive soft magnetic plates (non-conductive soft magnetic materials) 52a and 52b are housed in the depressed portions 51a and 51b formed in the shielding plate 31. In the case of using conductive materials in place of the non-conductive soft magnetic plates 52a and 52b, since the shielding plate itself is conductive, the conductive material and the shielding plate act as an integrated conductive member, so that it is not possible to strongly limit the distribution of the eddy current to the edges of the depressed portions 51a and 51b.

In addition, in this embodiment, heat-resistant plates 53a and 53b (53) which protect the non-conductive soft magnetic plates 52a and 52b from heat from the outside are disposed on the top (the steel strip 10 side) of the non-conductive soft magnetic plates 52a and 52b in the depressed portions 51a and 51b and fixed thereto by, for example, an adhesive.

In FIGS. 4A to 4C, a thickness D of the shielding plate 31 is 25 [mm] and a depth $D_m$ of each of the depressed portions 51a and 51b is 15 [mm]. Each of the non-conductive soft magnetic plates 52a and 52b has a shape corresponding with the shape (the shape of a cross-section perpendicular to the thickness direction of the shielding plate 31) in the plate face direction of the bottom portion of each of the depressed portions 51a and 51b, and a thickness $D_F$ thereof is 5 [mm]. However, these dimensions are not limited to the values described above. The inventors have confirmed that in a frequency range (5 [kHz] to 10 [kHz]) which is used in the induction heating device 20, if the thickness $D_F$ is equal to or more than 1 [mm] (and is equal to or less than the depth of each of the depressed portions 51a and 51b), in a case where the non-conductive soft magnetic plates 52a and 52b are housed and a case where the non-conductive soft magnetic plates 52a and 52b are not housed, a sufficient difference occurs in the effect of reducing the above-mentioned difference in temperature. Further, each of the heat-resistant plates 53a and 53b has a shape corresponding with the shape (the shape of a cross-section perpendicular to the thickness direction of the shielding plate 31) in the plate face direction of the bottom portion of each of the depressed portions 51a and 51b of the shielding plate 31, and a thickness $D_D$ thereof is 10 [mm].

As described above, by housing the non-conductive soft magnetic plates 52a and 52b in the depressed portions 51a and 51b, a magnetic field which is generated by an eddy current flowing in the shielding plate 31 due to the main magnetic flux is strengthened. By the strengthening of the magnetic field, the magnitudes of the eddy currents $I_{h1}$ and $I_{h2}$ flowing along the edges of the depressed portions 51a and 51b also become larger. Therefore, magnetic fields which are generated by these large eddy currents also become large, so that a larger eddy current which cancels out the eddy current flowing in the side end portion of the steel strip 10 can be produced in the vicinity of the side end portion. As a result, the effect of sufficiently pushing the eddy current of the side end portion of the steel strip 10 which is produced by the main magnetic flux into the inside in the width direction of the steel strip 10 is produced.

Further, as described above, in this embodiment, the corner portions 54a to 54h of the depressed portions 51a and 51b are rounded. However, it is acceptable if at least the corner portions 54a and 54e which are the "corner portions on the downstream side in the conveyance direction of the steel strip 10" of the depressed portions 51a and 51b are rounded so as to protrude in the downstream side direction and the corner portions 54b and 54f which are the "corner portions on the upstream side in the conveyance direction of the steel strip 10" of the depressed portions 51a and 51b are rounded so as to protrude in the upstream side direction. If doing so, even if the steel strip 10 moves in a meandering manner, it is possible to reduce the amount of change in the "overlap length in the conveyance direction of the steel strip 10" between the side end 10a of the steel strip and each of the depressed portions 51a and 51b" when viewed from the up-and-down direction, and it is also possible to reduce the amount of change in the effect of pushing the eddy current of the side end portion of the steel strip 10 further toward the inside than the side end portion. Further, as described above, since the eddy currents $I_{h1}$ and $I_{h2}$ flowing along the edges of the depressed portions 51a and 51b become large due to the non-conductive soft magnetic plates 52a and 52b, even if the steel strip 10 moves in a meandering manner, the magnitudes of the eddy currents $I_{h1}$ and $I_{h2}$ and the effect of pushing the eddy current flowing in the side end portion of the steel strip 10 further toward the inside than the side end portion can be maintained to some extent. Therefore, even if the steel strip 10 moves in a meandering manner, a change in temperature distribution in the width direction of the steel strip 10 can be reduced.

[Example]

Figure 5:
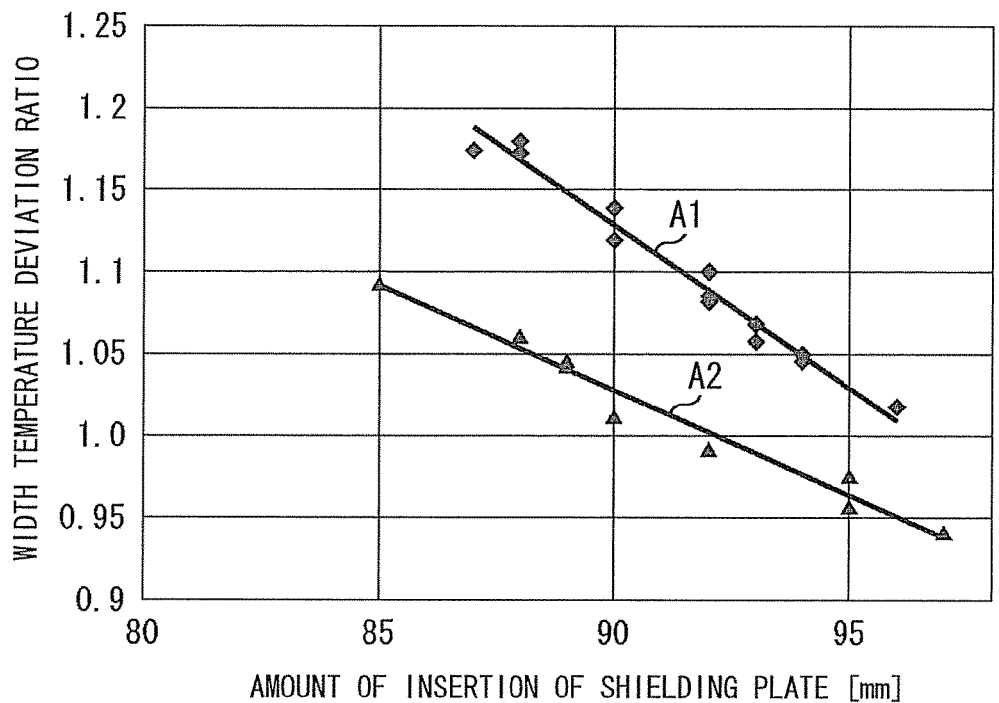
FIG. 5 is a diagram showing one example of the relationship between the amount of insertion of the shielding plate and a width temperature deviation ratio in an example using this embodiment.

FIG. 5 is a diagram showing one example of the relationship between the amount of insertion of the shielding plate and a width temperature deviation ratio.

The amount of insertion of the shielding plate corresponds to the "overlap length R in the width direction of the steel strip 10" between each of both side end portions of the steel strip 10 and each shielding plate (refer to FIG. 2B). Further, the width temperature deviation ratio is a value (=sheet width central portion temperature/sheet end portion temperature) obtained by dividing the temperature of the central portion in a temperature distribution in the width direction of the steel strip 10 (the sheet width central portion temperature) by the temperature of the end portion (the sheet end portion temperature).

In FIG. 5, in a graph A1, a plain shielding plate in which no depressed portion is formed is used. In a graph A2, a shielding plate having the depressed portions in which the non-conductive soft magnetic plates are housed, as in this embodiment, is used.

Here, the graphs shown in FIG. 5 are based on the results of experiments performed under the following conditions.

Heating coil width: 1300 [mm]
Material of core: ferrite
Material to be heated: stainless steel sheet (width of 900 [mm], and thickness of 0.3 [mm])
Gap between coils: 180 [mm]
Sheet conveyance speed: 50 [mpm (m/min.)]
Heating temperature: 400 to 730 [° C.] (the temperature increase of the center is set to be 330 [° C.])
Power-supply frequency: 8.5 [kHz]
Current: 3650 [AT]
Material of shielding plate: copper
External dimensions of shielding plate: width of 230 [mm], depth of 600 [mm], and thickness of 25 [mm]
Shape of depressed portion of shielding plate: FIG. 4A (graph A2)
Material of non-conductive soft magnetic plate: Ni—Zn ferrite
Thickness of non-conductive soft magnetic plate: 5 [mm]
Standard of amount of insertion of shielding plate: 90 [mm]

In FIG. 5, it can be found that the smaller the width temperature deviation ratio (the closer to 1 the width temperature deviation ratio), the more uniform a temperature distribution in the width direction of the steel strip 10 can be. Further, it can be found that the smaller the slope of the graph, the greater the change in temperature distribution in the width direction of the steel strip 10 can be reduced even if the steel strip 10 moves in a meandering manner.

In FIG. 5, it can be found that if the shielding plate having the depressed portions in which the non-conductive soft magnetic plates are housed is used, as in this embodiment, both the smoothing of a temperature distribution in the width direction of the steel strip 10 and reduction of a change in the temperature distribution in the width direction of the steel strip 10 at the time of meandering of the steel strip 10 can be realized.

[Summary]

As described, in this embodiment, the shielding plate 31 is disposed between the side end portion of the steel strip 10 and each of the cores 23 and 27 (the upper side heating coil 24 and the lower side heating coil 28). In the shielding plate 31, two depressed portions 51a and 51b are formed so as to have a distance therebetween in the conveyance direction of the steel strip 10. In addition, the non-conductive soft magnetic plates 52a and 52b are housed in the depressed portions 51a and 51b. Therefore, it is possible to strengthen a magnetic field which is generated by the eddy current flowing in the shielding plate 31d due to the main magnetic flux and make the magnitudes of the eddy currents $I_{h1}$ and $I_{h2}$ flowing along the edges of the depressed portions 51a and 51b larger. As a result, the smoothing of a temperature distribution in the width direction of the steel strip 10 can be realized. Further, by flowing the large eddy currents $I_{h1}$ and $I_{h2}$ along the edges of the depressed portions 51a and 51b in this manner, even if the steel strip 10 moves in a meandering manner, the effect in which the eddy currents $I_{h1}$ and $I_{h2}$ push the eddy current flowing in the side end portion of the steel strip 10 further toward the inside than the side end portion can be maintained to some extent. Accordingly, even if the steel strip 10 moves in a meandering manner, a change in temperature distribution in the width direction of the steel strip 10 can be reduced. In addition, even in a case where the steel strip 10 moves in a meandering manner, a magnetic field which is generated by the eddy current flowing in the shielding plate 31d pushes the side end of the steel strip 10 back to the center in the width direction of the steel strip 10, so that meandering of the steel strip 10 can be suppressed.

Further, in this embodiment, the corner portions 54a and 54e which are the "corner portions on the downstream side in the conveyance direction of the steel strip 10" of the depressed portions 51a and 51b are rounded so as to protrude in the downstream side direction and the corner portions 54b and 54f which are the "corner portions on the upstream side in the conveyance direction of the steel strip 10" of the depressed portions 51a and 51b are rounded so as to protrude in the upstream side direction. Therefore, even if the steel strip 10 moves in a meandering manner, it is possible to reduce the amount of change in the "overlap length in the conveyance direction of the steel strip 10" between the side end 10a of the steel strip and each of the depressed portions 51a and 51b" when viewed from the up-and-down direction, so that the amount of change in the push-in effect of the eddy current flowing in the side end portion of the steel strip 10 can also be reduced. Accordingly, a change in temperature distribution in the width direction of the steel strip 10 when the steel strip 10 moves in a meandering manner can be even further reduced.

Further, in this embodiment, since the heat-resistant plates 53a and 53b are disposed on the top (the steel strip 10 side) of the non-conductive soft magnetic plates 52a and 52b, even if the induction heating device is used under high temperature, degradation of the characteristics of the non-conductive soft magnetic plates 52a and 52b can be prevented. However, in a case where the induction heating device is not used under high temperature, there is no need to necessarily use the heat-resistant plates 53a and 53b. In a case where the heat-resistant plates 53a and 53b are not used in this manner, the thickness of the non-conductive soft magnetic plate which is housed in the depressed portion of the shielding plate may also be set to be the same as the depth of the depressed portion. In this manner, the thickness of the non-conductive soft magnetic plate may also be the same as the depth of the depressed portion and may also be less than the depth of the depressed portion.

[Modified Examples]

<Shielding Plate>

Figure 6A:
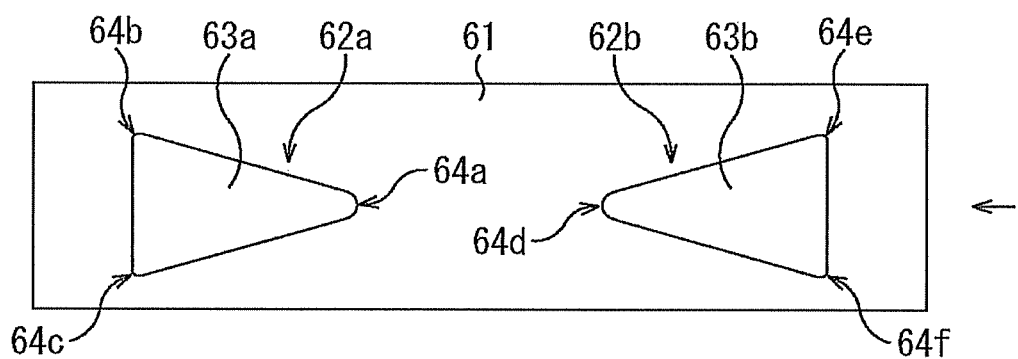
FIG. 6A is a top view showing one example of the configuration of a shielding plate according to the first modified example of this embodiment.
Figure 6B:
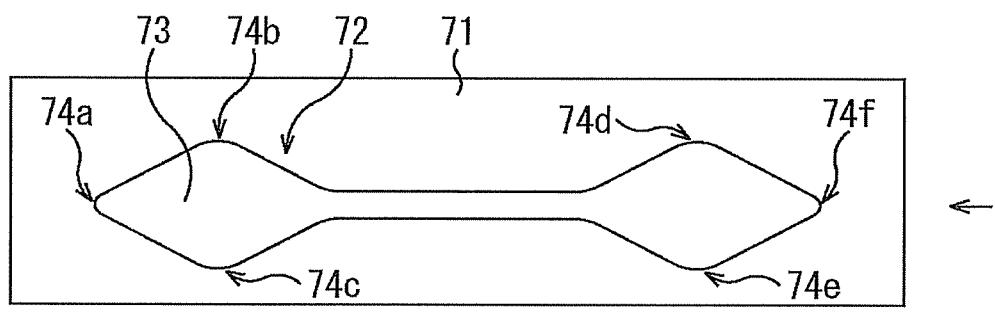
FIG. 6B is a top view showing one example of the configuration of a shielding plate according to the second modified example of this embodiment.
Figure 6C:
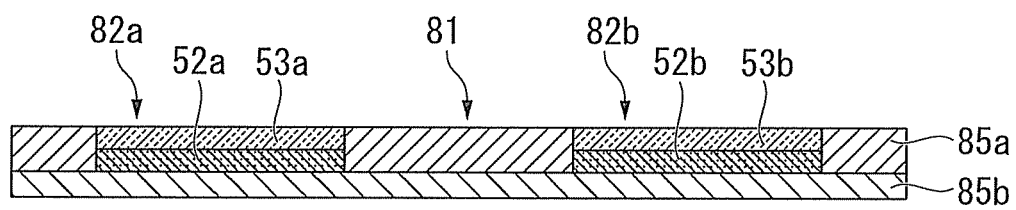
FIG. 6C is a vertical cross-sectional view showing one example of the configuration of a shielding plate according to the third modified example of this embodiment.

FIGS. 6A to 6C are diagrams showing modified examples of the configuration of the shielding plate. FIGS. 6A and 6B respectively show the first and the second modified examples of the shielding plate and are diagrams showing the shielding plate when viewed from directly above (from the steel strip 10 side). These drawings correspond to FIG. 4A.

In FIG. 6A, a shielding plate 61 is made of copper and has depressed portions 62a and 62b (62) disposed to have a distance therebetween in the conveyance direction of the steel strip 10 and having the same size and shape. In these points, the shielding plate 61 is the same as the shielding plate 31 shown in FIGS. 4A to 4C. However, as shown in FIG. 6A, the shape (the opening shape) in the plate face direction of the depressed portion 62a is a triangle which is tapered off toward the upstream side from the downstream side in the conveyance direction (a direction of an arrow shown in FIGS. 6A and 6B) of the steel strip 10 and in which the corner portions 64a to 64c (64) are rounded. In such a case, it is preferable that at least the corner portion 64a which is a "corner portion on the upstream side in the conveyance direction of the steel strip 10" of the depressed portion 62a be rounded so as to protrude in the upstream side direction.

Further, the shape (the opening shape) in the plate face direction of the depressed portion 62b is a triangle which is tapered off toward the downstream side from the upstream side in the conveyance direction of the steel strip 10 and in which the corner portions 64d to 64f (64) are rounded. In such a case, it is preferable that at least the corner portion 64d which is a "corner portion on the downstream side in the conveyance direction of the steel strip 10" of the depressed portion 62b be rounded so as to protrude in the downstream side direction.

Further, the non-conductive soft magnetic plates and the heat resistant plates 63a and 63b (63), each of which has a shape corresponding with the shape (the shape of a cross-section perpendicular to the thickness direction of the shielding plate 61) in the plate face direction of the bottom portion of each of the depressed portions 62a and 62b, are housed in the depressed portions 62a and 62b and fixed thereto using an adhesive or the like.

Further, in FIG. 6B, a shielding plate 71 is made of copper. As shown in FIG. 6B, the number of depressed portions 72 which are formed in the shielding plate 71 is one. As shown in FIG. 6B, the shape in the plate face direction of the depressed portion 72 is a shape in which the "corner portion (the corner portion 54b) on the upstream side in the conveyance direction of the steel strip 10" of the depressed portion 51a shown in FIGS. 4A to 4C and the "corner portion (the corner portion 54e) on the downstream side in the conveyance direction of the steel strip 10" of the depressed portion 51b are connected to each other, and the corner portions 74a to 74f (74) are rounded. Further, a non-conductive soft magnetic plate and a heat resistant plate 73, each of which has a shape corresponding with the shape (the shape of a cross-section perpendicular to the thickness direction of the shielding plate 71) in the plate face direction of the bottom portion of the depressed portion 72, are housed in the depressed portion 72 and fixed thereto using an adhesive or the like.

As described above, it is preferable that a portion (a second portion) which is tapered off toward the upstream side from the downstream side in the conveyance direction of the steel strip 10 and a portion (a first portion) which is tapered off toward the downstream side from the upstream side in the conveyance direction of the steel strip 10 be included in the depressed portion which is formed in the shielding plate. The first portion and the second portion may also be formed individually (FIGS. 4A and 6A) and may also be formed integrally (FIG. 6B). In addition, it is preferable that the tapered first and second portions face each other in the conveyance direction of the steel strip 10. If the shape in the plate face direction of the depressed portion is such a shape, it becomes possible to form the edge of the depressed portion of the shielding plate according to a pathway of an eddy current flowing through the steel strip 10. Further, in this case, it is preferable that at least the tapered end portion (the tapered portion) among the "corner portions on the upstream side and the downstream side in the conveyance direction of the steel strip 10" of the depressed portion be rounded.

In addition, the shape (the opening shape) in the plate face direction of the depressed portion which is formed in the shielding plate may also be any shape and the number thereof may also be 1 and may also be 2 or more.

Further, it is preferable that a portion (a third portion) which is tapered off toward a side close to the central portion in the width direction (a direction perpendicular to the conveyance direction) of the conductive sheet from a side away from the central portion in the width direction of the conductive sheet be included in the depressed portion. In this case, it is possible to gradually increase the amount of change in the effect in which the magnetic field that is generated by the eddy current flowing in the shielding plate pushes the side end of the steel strip into the center side in the width direction of the steel strip, so that suppression of meandering of the conductive sheet can be more flexibly controlled. For example, in FIG. 4A, two third portions are included in the two depressed portions 51a and 51b of the shielding plate 31. In addition, only a single depressed portion may be formed in the shielding plate and the third portion may be included in the single depressed portion. However, if a plurality of third portions is included in the depressed portion of the shielding plate, it is possible to more uniformly produce the above-mentioned push-in effect. Further, a portion (a fourth portion) which is tapered off toward a side away from the central portion in the width direction of the conductive sheet from a side close to the central portion in the width direction of the conductive sheet may also be included.

FIG. 6C shows the third modified example of the shielding plate and is a vertical cross-sectional views of the shielding plate when cut in the thickness direction of the shielding plate along the conveyance direction of the steel strip 10. FIG. 6C corresponds to FIG. 4B.

In FIG. 6C, a shielding plate 81 is made of copper and has depressed portions 82a and 82b (82) disposed to have a distance therebetween in the conveyance direction of the steel strip 10 and having the same size and shape. Further, the shape (the opening shape) in the plate face direction of each of the depressed portions 82a and 82b is a rhombus in which each corner portion is rounded. In this manner, the shielding plate 81 shown in FIG. 6C and the shielding plate 31 shown in FIGS. 4A to 4C are the same in material, shape, and size. However, the shielding plate 81 shown in FIG. 6C is formed by superimposing an upper plate 84a and a lower plate 84b on each other and fixing them to each other.

As described above, the shielding plate may also be integrally formed and may also be formed by combining a plurality of members.

Moreover, although in this embodiment, the shielding plate is made of copper, the shielding plate is not limited to a copper plate. That is, provided that the shielding plate is a conductor, preferably, a conductor having a relative permeability of 1, the shielding plate may also be formed of any material. For example, the shielding plate can be formed of aluminum.

In addition, in this embodiment, by increasing the magnitude of the eddy current in the shielding plate which is generated in the vicinity of the non-conductive soft magnetic plate (the non-conductive soft magnetic material), the magnitude of the eddy current which flows in the side end portion of the steel strip (the conductive sheet) 10 due to the main magnetic flux is reduced. Further, since the conductive shielding plate is interposed between the core (or, the heating coil) and the non-conductive soft magnetic plate, direct passage of the main magnetic flux through the non-conductive soft magnetic plate can be avoided. For this reason, it is acceptable if the induction heating device includes the heating coil, the core, the conductive shielding plate which is disposed between the core and the side end portion in a direction perpendicular to the conveyance direction of the steel strip, and the non-conductive soft magnetic plate which is attached to the shielding plate such that the shielding plate is interposed between the core and the non-conductive soft magnetic plate.

Figure 7A:
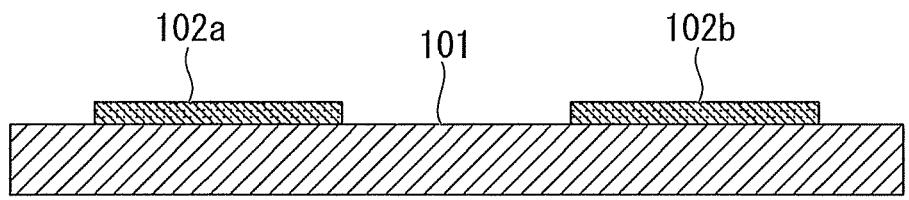
FIG. 7A is a vertical cross-sectional view showing one example of the configuration of a shielding plate according to the fourth modified example of this embodiment.
Figure 7B:
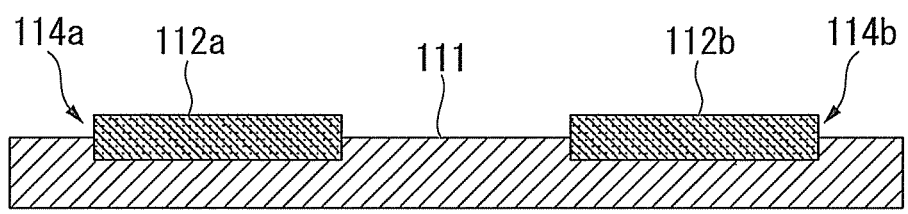
FIG. 7B is a vertical cross-sectional view showing one example of the configuration of a shielding plate according to the fifth modified example of this embodiment.
Figure 7C:
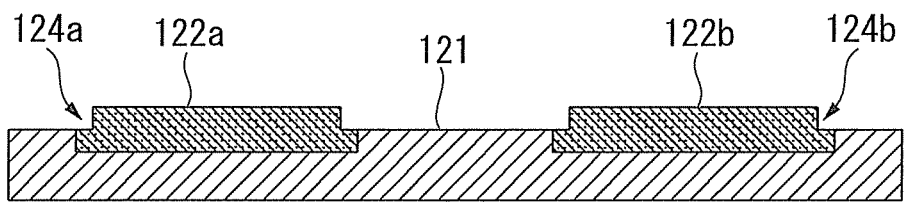
FIG. 7C is a vertical cross-sectional view showing one example of the configuration of a shielding plate according to the sixth modified example of this embodiment.
Figure 8A:
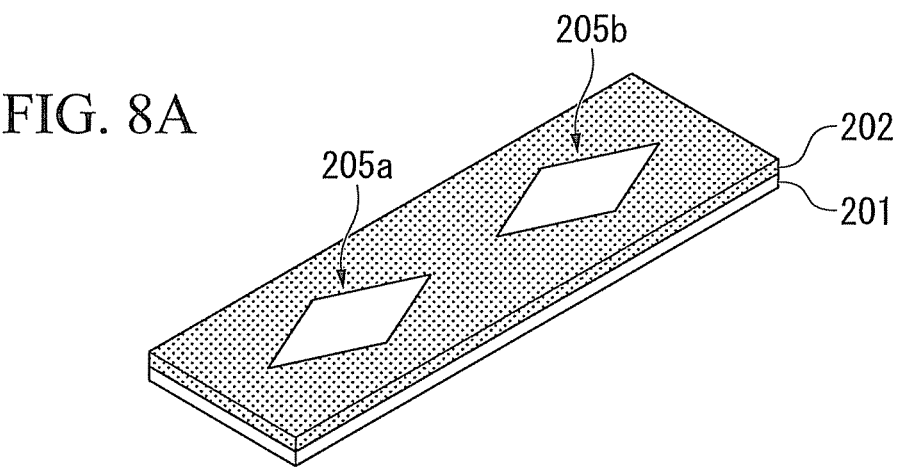
FIG. 8A is a perspective view showing one example of the configuration of a shielding plate according to the seventh modified example of this embodiment.
Figure 8B:
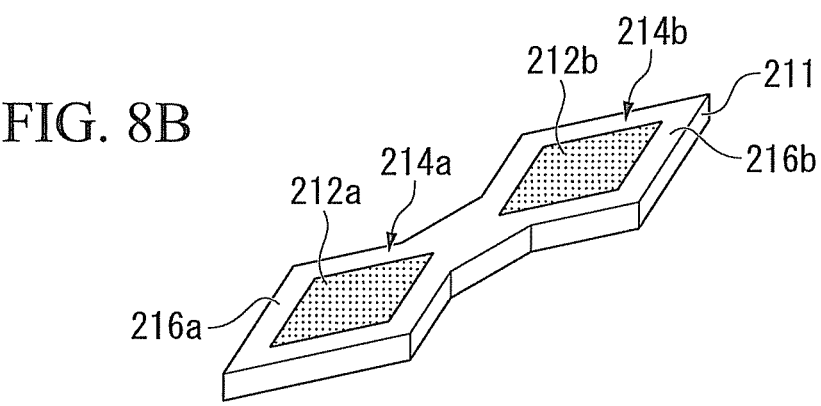
FIG. 8B is a perspective view showing one example of the configuration of a shielding plate according to the eighth modified example of this embodiment.
Figure 8C:
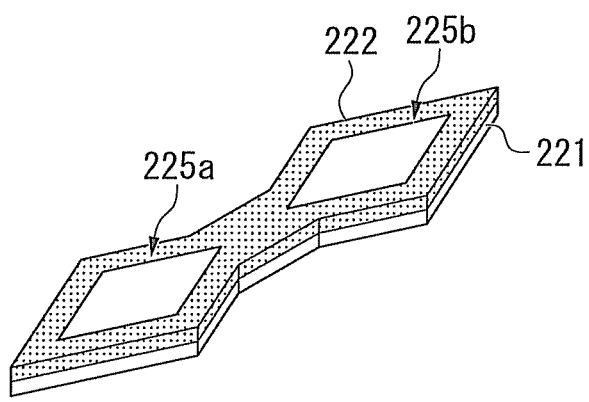
FIG. 8C is a perspective view showing one example of the configuration of a shielding plate according to the ninth modified example of this embodiment.

For this reason, for example, shielding plates in which the non-conductive soft magnetic plates as shown in FIGS. 7A to 7C and 8A to 8C are mounted can be used. In addition, FIGS. 7A to 7C are vertical cross-sectional views showing one example of the configuration of each of shielding plates in the fourth to the sixth modified examples of this embodiment. Further, FIGS. 8A to 8C are perspective views showing one example of the configuration of each of shielding plates in the seventh to the ninth modified examples of this embodiment.

In the fourth modified example of this embodiment shown in FIG. 7A, non-conductive soft magnetic plates 102a and 102b (102) are disposed on a flat shielding plate 101 and the non-conductive soft magnetic plates 102 face the side end portion of the steel strip. In this manner, the non-conductive soft magnetic plates may also be mounted on the shielding plate such that protruded portions are formed on the shielding plate, without forming a depressed portion in the shielding plate. In this case, it is possible to increase an eddy current in the shielding plate in a peripheral portion of the contact surface between the shielding plate and the non-conductive soft magnetic plate. However, since by forming a depressed portion in a shielding plate and disposing a non-conductive soft magnetic plate in the depressed portion, an eddy current can be constrained in an edge of the depressed portion and the distance between an edge of the depressed portion and the non-conductive soft magnetic plate can be reduced, it is possible to secure a larger eddy current at the edge of the depressed portion. For this reason, as shown in FIG. 7B (the fifth modified example), it is also acceptable that depressed portions 114a and 114b (114) be formed in a shielding plate 111 and non-conductive soft magnetic plates 112a and 112b (112) be mounted in the depressed portions 114 of the shielding plate 111 such that protruded portions are formed on the shielding plate 111. Further, as shown in FIG. 7C (the sixth modified example), non-conductive soft magnetic plates 122a and 122b (122) in which the shape of the upper surface and the shape of the lower surface are different from each other may also be mounted in depressed portions 124a and 124b (124) of a shielding plate 121.

Further, in the seventh modified example shown in FIG. 8A, a non-conductive soft magnetic plate 202 is mounted on a shielding plate 201 having protruded portions (two rhombic portions) 205a and 205b (205). In this case, it is possible to increase eddy currents flowing in edges of the protruded portions 205. Further, the shape (the outer peripheral shape) of the shielding plate is not particularly limited. In the eighth modified example shown in FIG. 8B, depressed portions (two rhombic portions) 214a and 214b (214) are formed in a shielding plate 211 and the shielding plate 211 has frame portions 216a and 216b following the outer peripheral shapes (the opening shapes) of the depressed portions 214. Further, non-conductive soft magnetic plates 212a and 212b (212) are housed in the depressed portions 214. In this case, it is possible to increase eddy currents flowing in edges of the depressed portions 214. Further, in the ninth modified example shown in FIG. 8C, protruded portions (two rhombic portions) 225a and 225b (225) are formed on a shielding plate 221 and the shielding plate 221 has an outer peripheral shape similar to (following) the outer peripheral shapes (the base end shapes) of the protruded portions 225. Further, a non-conductive soft magnetic plate 222 is disposed on the shielding plate 221 so as to surround edge portions of the protruded portions 225. In this case, it is possible to increase eddy currents flowing in edges of the protruded portions 225.

In addition, a heat-resistant plate may also be mounted on the non-conductive soft magnetic plate in each modified example shown in FIGS. 7A to 7C and 8A to 8C. Further, the shape and the number of depressed portions or protruded portions of the shielding plate in the plate face direction are not particularly limited. Further, the shape and the number of non-conductive soft magnetic plates are also not particularly limited.

It is preferable to make the magnitude of the eddy current in the shielding plate which flows through the vicinity of the non-conductive soft magnetic plate, as large as possible. In the following, the configuration of making the eddy current larger will be described.

FIG. 4E is a cross-sectional view as viewed from a direction of C-C' in FIG. 4B. As shown in FIG. 4E, the non-conductive soft magnetic plates 52a and 52b (52) are included in the cross section, and a boundary portion (a boundary line) between the shielding plate 31 and each of the non-conductive soft magnetic plates 52 describes a closed curve (a total of two closed curves). That is, a case where the shielding plate surrounds the non-conductive soft magnetic plate and a case where the non-conductive soft magnetic plate surrounds the shielding plate are included in the cross section. In this manner, if the shielding plate has a cross section perpendicular to the thickness direction including the non-conductive soft magnetic material (a cross section parallel to the coil face), the distance between the non-conductive soft magnetic plate and the eddy current in the shielding plate, which is strengthened by the non-conductive soft magnetic plate, can be shortened. Further, the above-mentioned boundary portion describes a closed curve (is ring-shaped), whereby an area of an eddy current which is strengthened can increase and the characteristic of the non-conductive soft magnetic plate can be fully utilized. In addition, in order to make the magnitude of the eddy current in the shielding plate which flows through the vicinity of the non-conductive soft magnetic material, as large as possible, it is preferable that the shielding plate and the non-conductive soft magnetic material be in contact with each other. However, a space (a space as a boundary portion) may also be present between the shielding plate and the non-conductive soft magnetic material such that the non-conductive soft magnetic material can be easily attached to the shielding plate.

Further, in the case of using the induction heating device under high temperature or the case of rapidly heating the steel strip, the temperature of the shielding plate sometimes becomes high due to an eddy current. In this case, it is preferable to cool the shielding plate and the non-conductive soft magnetic material using a cooler such as a water-cooling pipe. This cooling method is not particularly limited. For example, the shielding plate may also be cooled by integrally forming a water-cooling line in the shielding plate, or the shielding plate may also be cooled by sending a gas to the shielding plate by a blower.

<Non-conductive Soft Magnetic Plate and Heat-resistant Plate>

A material constituting the non-conductive soft magnetic plate is not limited to a soft magnetic ferrite, provided that it is a non-conductive soft magnetic material. Further, the non-conductive soft magnetic material may also be a material in which powder or particles are packed or compacted, or a material in which a plurality of blocks is combined, rather than a plate. Further, the shape of the non-conductive soft magnetic plate is not particularly limited. If it is possible to dispose a non-conductive soft magnetic plate according to the portion (for example, the edge of the depressed portion) of the inside of the shielding plate, in which the eddy current flows, since it is possible to obtain a magnetic field which enhances the eddy current, for example, the non-conductive soft magnetic plate may also have a hollow portion. However, in order to sufficiently use the magnetism of the non-conductive soft magnetic plate, it is preferable that the non-conductive soft magnetic plate be solid.

The heat-resistant plate also need not necessarily be a plate and may also be any material, provided that a heat-resistant material is used.

Further, a method of fixing the non-conductive soft magnetic plate and the heat-resistant plate which are housed in the depressed portion, to the inside of the depressed portion is not limited to a method using an adhesive. For example, it is possible to fix them to the depressed portion using a screw with insulation secured between the shielding plate and the non-conductive soft magnetic plate and the heat-resistant plate.

<Others>

In this embodiment, the disposition place of the induction heating device 20 is not limited to the position shown in FIG. 1. That is, provided that it is possible to inductively heat a conductive sheet by a transverse method, the induction heating device 20 may also be disposed anywhere. For example, the induction heating device 20 may also be disposed in the second container 12. Further, the induction heating device 20 may also be applied to places other than the continuous annealing line.

Further, in this embodiment, a case where the heating coil width and the gap between the heating coils are equal to each other has been described as an example. However, the heating coil width and the size of the gap are not particularly limited. However, it is preferable that the heating coil width be equal to or greater than the gap (or, the heating coil width be greater than the gap). In this case, a main magnetic field which is generated from the induction heating device 20 becomes more than a leak magnetic field, thereby being able to improve the heating efficiency of the induction heating device 20. In addition, the upper limit of the heating coil width can be appropriately determined according to the conditions such as a space where the induction heating device 20 is disposed, or the weight or the cost which is required for the induction heating device 20. Further, the numbers of heating coils and cores disposed are not particularly limited. For example, a plurality of the heating coil and the core can be disposed in the conveyance direction of the steel strip in order to flexibly perform the heating control of the steel strip.

In addition, the number of shielding plates disposed is also not particularly limited. For example, a plurality of the shielding plates may also be disposed in the conveyance direction of the steel strip in accordance with the numbers of heating coils and cores disposed. A plurality of shielding plates having a single depressed portion may also be disposed to form a shielding plate unit having a plurality of depressed portions.

Further, in this embodiment, a case where the upper side inductor 21 and the lower side inductor 22 are provided has been shown as an example. However, only one of either the upper side inductor 21 or the lower side inductor 22 may also be provided.

In addition, all the embodiments of the present invention described above merely show examples embodied in implementation of the present invention and the technical scope of the present invention should not be construed as being limited by these. That is, the present invention can be implemented in various forms without departing from the technical idea thereof or the main features thereof.

Industrial Applicability

A transverse flux induction heating device is provided which allows unevenness of a temperature distribution in the width direction of a conductive sheet of a heating target to be reduced and allows variation in temperature distribution in the width direction of the conductive sheet of the heating target due to meandering of the conductive sheet to be reduced.

REFERENCE SYMBOL LIST

10: steel strip (conductive sheet)
18: alternating-current power supply unit
20: induction heating device
21: upper side inductor
22: lower side inductor
23, 27: core
24: upper side heating coil (heating coil)
28: lower side heating coil (heating coil)
31, 61, 71, 81, 101, 111, 121, 201, 211, 221: shielding plate
51, 62, 72, 82, 114, 124, 214: depressed portion
205, 225: protruded portion
52, 102, 112, 122, 202, 212, 222: non-conductive soft magnetic plate (non-conductive soft magnetic material)
53, 63, 73: heat-resistant plate (heat-resistant material)

What is claimed is:
1. A transverse flux induction heating device which inductively heats a conductive sheet by allowing an alternating magnetic field to intersect a sheet face of the conductive sheet, the conductive sheet being conveyed in one direction, the transverse flux induction heating device comprising:
a heating coil disposed such that a coil face faces the sheet face of the conductive sheet;
a core around which the heating coil is coiled;
a shielding plate formed of a conductor and disposed between the core and a side end portion of the conductive sheet in a direction perpendicular to a conveyance direction of the conductive sheet, the shielding plate facing the side end portion of the conductive sheet; and a non-conductive soft magnetic material which is attached to the shielding plate, wherein the shielding plate is interposed between the core and the non-conductive soft magnetic material, a first depressed portion and a second depressed portion, which face the side end portion of the conductive sheet in the direction perpendicular to the conveyance direction of the conductive sheet are formed in a surface of the shielding plate, the surface facing the conductive sheet, the first depressed portion and the second depressed portion being horizontal to each other, and the non-conductive soft magnetic material is housed in each of the first depressed portion and the second depressed portion.

2. The transverse flux induction heating device according to claim 1, further comprising:

a heat-resistant plate which is attached to the non-conductive soft magnetic material and is positioned between the non-conductive soft magnetic material and the conductive sheet.

3. The transverse flux induction heating device according to claim 1, wherein the shielding plate has a cross section parallel to the coil face, the cross section including the non-conductive soft magnetic material.

4. The transverse flux induction heating device according to claim 1, wherein the first depressed portion and the second depressed portion are formed in the surface of the shielding plate to be tapered off toward a side end portion of the shielding plate in a width direction of the shielding plate from a central portion of the shielding plate in the width direction of the shielding plate.

5. The transverse flux induction heating device according to claim 1, wherein a first portion which is tapered off toward a downstream side from an upstream side in the conveyance direction of the conductive sheet and a second portion which is tapered off toward the upstream side from the downstream side in the conveyance direction of the conductive sheet are included in each of the first depressed portion and the second depressed portion, and the first portion and the second portion face each other in the conveyance direction of the conductive sheet.

6. The transverse flux induction heating device according to claim 1, wherein each of the first depressed portion and the second depressed portion has a depth Dm which is less than a thickness D of the shielding plate.

7. The transverse flux induction heating device according to claim 5, wherein the first portion is rounded toward the downstream side, and the second portion is rounded toward the upstream side.

* * * * *